United States Patent Office 3,689,412
Patented Sept. 5, 1972

3,689,412
GREASE COMPOSITION
George J. Quaal, Midland, and Alfred Lewis, Saginaw, Mich., assignors to Dow Corning Corporation, Midland, Mich.
No Drawing. Filed Mar. 17, 1971, Ser. No. 125,325
Int. Cl. C10m 5/12, 7/16, 7/50
U.S. Cl. 252—49.6    8 Claims

ABSTRACT OF THE DISCLOSURE

Solid p-oxybenzoyl polymer is added in powder form to a lubricating oil vehicle in an amount sufficient to thicken the mixture to a grease-like consistency.

---

This invention relates to improved grease composition. In one aspect, the invention relates to novel heat-stable greases which contain poly(p-oxybenzoyl) as a thickener.

Certain grease compositions, generally designated bearing greases, are designed to operate at high mechanical loading. In addition to being stable under these mechanical stresses, the grease composition must be thermally stable. Also it is desirable that grease compositions retain their physical properties even after exposure to radiation.

Conventional greases are made by adding soaps, such as lithium stearate or finely divided solid filler materials, such as silica or bentonite to a lubricating oil vehicle in an amount sufficient to form an intimate mixture of butter-like consistency. Generally, the particulate fillers do not enhance the thermal stability of the grease and in some instances, the filler material actually reduces the lubricity of the grease because of the abrasive nature of the solid. In addition to lubricity and thermal stability, another consideration in the selection of a grease filler is that it should be chemically inert with respect to the metal surfaces to be lubricated.

By the practice of the present invention wherein p-oxybenzoyl polymer is utilized as a grease thickener, one obtains a lubricating composition which is stable under heavy loadings at high temperature. Also, the grease compositions of the invention are highly inert and resist degradation when exposed to radiation.

Thus, it is an object of the present invention to provide an improved lubricant composition.

It is another object of the invention to provide heat-stable, radiation-resistant grease compositions.

These and other objects of the invention will be apparent to one skilled in the art upon consideration of the following disclosure and claims.

In accordance with the invention, there is provided a grease composition comprising an intimate mixture of a lubricating oil vehicle and a thickening amount, sufficient to thicken the mixture to a grease consistency, of powdered, solid polymeric composition consisting essentially of recurring p-oxybenzoyl units.

The lubricating oil vehicle can be any nonreactive stable fluid having a viscosity at 25° C. of from about 20 to 600,000 cs., i.e.; any oil that is used in presently known greases. The term "nonreactive" implies that the oil must be substantially nonreactive, chemically, with the grease thickener, air, water and other materials commonly found in the environment where the grease is utilized. The term "stable" is taken to mean that the fluid does not easily decompose. Thus, the fluid is stable throughout the temperature range in which the grease is to be employed.

Any fluid of the above description is suitable for use in formulating the grease compositions of the invention. Both natural hydrocarbons and synthetic lubricating oils can be used. The hydrocarbons include mineral oils derived from paraffin base, naphthene base and mixed base distillate or oils; and other petroleum lubricants such as those derived from coal products. The synthetic oils include alkylene polymers, such as polypropylene, butylene, etc. and mixtures thereof, alkylene oxide-type polymers, such as are produced by polymerizing propylene oxide in the presence of ethyl alcohol; esters of alkylene oxide polymers for example, acetylated propylene oxide polymers; and polyethers prepared from alkylene glycols. These polymeric products, prepared from the various alkylene oxides or alkylene glycols, may be polyoxyalkene diols or polyalkylene glycol derivatives; that is, the terminal hydroxyl groups can remain as such, or one or both of the terminal hydroxyl groups can be removed during the polymerization reaction by esterification or etherification.

Another class of suitable synthetic oils is the dicarboxylic acid ester type prepared by esterifying dicarboxylic acids, such as adipic acid, azelaic acid, suberic acid, sebic acid, alkenyl succinic acid, fumaric acid, maleic acid and the like with alcohols, such as butyl alcohol, hexyl alcohol, 2-ethylhexyl alcohol and dodecyl alcohol. Examples of dibasic (dicarboxylic) acid ester oils include dibutyl adipate, dihexyl adipate, di-2-ethylhexyl sebacate and di-n-hexylfumaric polymers. Other classes of suitable synthetic oil vehicles include alkylated aromatics, such as dodecylbenzene, tetradecylbenzene and didodecylbenzene; polyhydric alcohol esters, such as esters of trimethylol propane and pentaerythritol; phosphate esters, such as tricresyl phosphate and methyldiphenyl phosphate; and halogenated hydrocarbon polymers, such as chlorotrifluoroethylene polymers.

Preferred synthetic vehicles include perfluoroalkylpolyethers, polyphenylethers and oily silicone polymers. Exemplary organopolysiloxanes include dimethylpolysiloxanes, phenylmethylpolysiloxanes; chlorophenylmethylpolysiloxanes; 3,3,3-trifluoropropylmethylpolysiloxanes; ethylpropylpolysiloxanes; and copolymers of the above, such as dimethylsiloxy-phenylmethylsiloxy copolymers and dimethylsiloxytrifluoropropylmethylsiloxy copolymers. These diorganopolysiloxane polymers can be end-blocked with triorganosilyl groups, such as trimethylsilyl or phenyldimethylsilyl units.

The lubricating oil vehicles can vary greatly in viscosity depending on the properties desired in the grease composition. Mineral oils having a SUS viscosity at 100° F. of from about 50 to 10,000 can be used. Organopolysiloxane fluids having a viscosity of from 50 to 100,000 cs. at 25° C. are of general utility, but in special applications the organopolysiloxane can have a viscosity of as high as 600,000 cs. Preferred viscosities for the siloxane fluids are in the range of from 100 to 10,000 cs. at 25° C.

The powdered polymer which is utilized as the thickener in the grease compositions of the invention is poly(p-oxybenzoyl), which is commercially available from the Carborundum Company, Niagara Falls, N.Y. The polymer can be characterized as a linear repeating chain of units of the formula

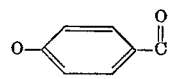

and is a highly crystalline solid having inherent lubricating properties. A detailed description of the p-oxybenzoyl polymer's properties is given in SAMPE Journal, August/September 1970 in an article authored by J. Economy, et al. The high-temperature aromatic polyester is produced by the condensation of para-hydroxybenzoic acid as described in British Pat. 1,173,121.

The solid polymeric material is used in its finely divided particulate form and mixed with the lubricating oil vehicle to form the grease compositions. Any suitable mixing apparatus, such as a 3-roll mill, industrial shear mixer or the like, can be used in formulating the grease. The particle size of the thickener is not critical, but the average particle size is in the range of 1 to 150 microns. Any major amounts of particles larger than 150 microns result in a "grainy" grease which cannot be tolerated in certain applications.

It should be noted that, for any given fluid vehicle there is a definite range of proportions of fluid to solid powdered p-oxybenzoyl polymer which will result in an acceptable grease. The chemical substituents and viscosity of the fluid are factors determining this range. Excess thickener will cause the composition to be crumbly and unsuitable as a grease, while excess fluid will cause the mixture to be muddy and bleed. Generally, 10 to 40 weight percent thickener, based on the weight of grease composition, forms a satisfactory grease. The optimum proportions for a particular composition are easily determined by simple experimentation.

In addition to the lubricating oil vehicle and the polymeric thickener, the grease compositions can contain small amounts of other materials, such as pigments, dyes, antioxidants, corrosion inhibitors, dispersants, extreme pressure additives, anti-wear additives and the like which are conventionally used. For reasons of economy, it may be desirable to add small quantities of other well-known thickeners to the grease compositions of the invention.

The following examples are illustrative and not to be considered as unduly limiting of the invention which is delineated in the claims. In the examples the following tests were employed to determine the properties of the grease compositions:

Evaporation—ASTM Method D-927
Drop point—ASTM Method D-566
Bleed—AN-G-3A Modified Methods C-75T and C-77T
Heat stability (under mechanical shear as shown by penetration)—ASTM D-17-52T lubrication properties of the different greases were determined by the LFW-1 test, the 4-Ball method and a bearing life test. In obtaining the LFW-1 results, an Alpha LFW-1 test machine (described in U.S. Pat. 3,028,746) was operated in the oscillating mode, using a standard steel ring (Rc60) and a Rc30 steel block at a 10° arc and 75 cycles/minute for 5000 cycles. The 4-Ball tests were run on a Roxanna wear tester in which a ½-inch steel ball was rotated against three stationary ½-inch steel balls at a rate of 600 r.p.m. at a temperature of 167° F. for one hour under a constant load of 10 or 40 kilograms. The bearing test was run in accordance with Federal Standard 791, Method 33. The bearing was run at 10,000 r.p.m. under 320 lbs. load at a temperature of 450° F.

EXAMPLE 1

Sufficient powdered p-oxybenzoyl polymer, having a particle size in the range of 5–45 microns, was mixed with trimethylsilyl-terminated 3,3,3-trifluoropropylmethylpolysiloxane (1000 cs.) to form a first grease composition containing 20.5 weight percent of the solid polymer. The oil and thickener were mixed on a 3-roll mill until an intimate dispersion was obtained.

A second grease composition containing 17.8 weight percent of the powdered p-oxybenzoyl polymer and 82.2 weight percent trimethylsilyl-terminated phenylmethylpolysiloxane (660 cs.) was formulated in the same manner as described above.

The physical characteristics and lubrication properties of these grease compositions are listed below:

| Grease composition | No. 1 | No. 2 |
|---|---|---|
| Penetration: | | |
| Off-mill | 297 | 294 |
| Unworked | 297 | 294 |
| Worked (60 strokes) | 297 | 294 |
| Bleed (percent): | | |
| 22 hours/400° F | 6.2 | 8.7 |
| 22 hours/450° F | 9.1 | 8.7 |
| Evaporation (percent): | | |
| 22 hours/400° F | 1.3 | 0.3 |
| 22 hours/450° F | 5.7 | 1.4 |
| Dropping point (° F.) | 350 | 453 |
| LFW-1 wear scar (mm.): | | |
| At 90 lbs. load | 0.97 | 0.73 |
| At 150 lbs. load | 1.2 | 0.97 |
| Four Ball wear scar (mm.): | | |
| At 4 kg. load | | 1.0 |
| At 10 kg. load | 0.25 | 1.9 |
| At 40 kg. load | 0.73 | |
| Bearing life (hours) | 144 | |

The radiation resistance of a grease composition based on the phenylmethylpolysiloxane (similar to grease No. 2) was determined by measuring the grease properties before and after exposure to a 50 Megarad radiation dosage. The properties are as follows:

| | Initial | After exposure |
|---|---|---|
| Penetration | 294 | 294 |
| Bleed (percent) 22/450° F | 8.7 | 7.7 |
| Evaporation (percent) 22/450° F | 1.4 | 1.5 |
| LFW-1 scar (150 lbs.), mm | 0.9 | 0.9 |

These data demonstrate the heat stability, radiation resistance and lubricating properties of grease compositions prepared in accordance with the invention.

EXAMPLE 2

Several grease compositions using various lubricating oil vehicles and the powdered p-oxybenzoyl polymer described in Example 1 were formulated by mixing on a 3-roll mill. The grease compositions were as follows:

Composition No. 1—73.6 weight percent dimethylpolysiloxane (350 cs.) and 26.4 weight percent powdered poly(p-oxybenzoate).

Composition No. 2—75.4 weight percent copolymeric siloxane (100 cs.) having 50 mole percent dimethyl siloxy and 50 mole percent 3,3,3-trifluoropropylmethylsiloxy units and 24.6 weight percent powdered p-oxybenzoyl polymer.

Composition No. 3—75.0 weight percent copolymeric siloxane (130 cs.) having 50 mole percent dimethylsiloxy and 50 mole percent phenylmethylsiloxy units and 25 weight percent powdered p-oxybenzoyl polymer.

Composition No. 4—79.0 weight percent octylmethylpolysiloxane (375 cs.) and 21.0 weight percent powdered p-oxybenzoyl polymer.

Composition No. 5—70.6 weight percent white mineral oil (147 cs.) and 29.4 weight percent powdered p-oxybenzoyl polymer.

Composition No. 6—73.4 weight percent polyalkyleneglycol lubricating oil (251 cs.)—available as "UCON LB-625" from Union Carbide Company—and 26.6 weight percent powdered p-oxybenzoyl polymer.

Composition No. 7—64.8 weight percent tribasic acid ester lubricating oil (50 cs.)—available as "Emery 3821-D" from Emery Company—and 35.2 weight percent powdered p-oxybenzoyl polymer.

Composition No. 8—75.7 weight percent tricresyl phosphate (55 cs.) available as "Kronitex AA" from FMC—and 24.3 weight percent powdered p-oxybenzoyl polymer.

Composition No. 9—87.0 weight percent perfluoroalkylpolyether—available as "Krytox 153-AC" from du Pont Chemicals—and 13 weight percent powdered p-oxybenzoyl polymer.

Composition No. 10—87.5 weight percent polyphenylether lubricating oil and 12.5 weight percent powdered p-oxybenzoyl polymer.

The physical properties and lubrication data for each of the compositions is set forth in the following table:

TABLE

| Grease composition No.: | Penetration, off mill/ unworked/ worked | Percent bleed at— | | Percent evaporation at— | | Dropping point (° F.) | LFW-1 wear scar at— | |
|---|---|---|---|---|---|---|---|---|
| | | 300 ° F. | 450 ° F. | 300 ° F. | 450 ° F. | | 90 lbs. | 150 lbs. |
| 1 | 294/294/301 | | 7.5 | | 0.9 | 530 | 3.0 | 3.0 |
| 2 | 297/294/297 | | 8.2 | | 6.9 | 460 | 1.8 | 1.8 |
| 3 | 294/305/313 | | 7.4 | | 2.8 | 390 | 1.0 | 0.9 |
| 4 | 297/309/309 | 10.8 | | 2.5 | | 470 | 1.6 | 1.8 |
| 5 | 294/283/286 | 3.9 | | 9.2 | | 425 | 1.1 | 1.7 |
| 6 | 297/297/305 | 0.1 | | | | 465 | 2.0 | 2.1 |
| 7 | 294/286/297 | 2.2 | | 8.1 | | 475 | 1.6 | 1.9 |
| 8 | 297/283/294 | 4.3 | | 13.1 | | 495 | 0.9 | 1.3 |
| 9 | 297/301/305 | | 12.7 | | 15.6 | 365 | 1.3 | 1.5 |
| 10 | 290/290/297 | | 11.2 | | 8.3 | 535 | 0.8 | 0.8 |

These data demonstrate the effectiveness of various lubricating oils when used as the vehicle in grease compositions of the invention.

Reasonable modification and variation are within the scope of the present invention which is directed to novel grease compositions.

That which is claimed is:

1. A lubricant composition comprising an intimate mixture of a lubricating oil vehicle and a thickening amount sufficient to thicken the mixture to a grease consistency, of solid, powdered p-oxybenzoyl polymer.

2. The lubricant composition of claim 1 wherein the lubricating oil is a diorganopolysiloxane.

3. The lubricant composition of claim 2 wherein the diorganopolysiloxane has a viscosity, as determined at 25° C., of from 50 to 10,000 cs.

4. The lubricant composition of claim 2 wherein the lubricating oil is 3,3,3-trifluoropropylmethylpolysiloxane.

5. The lubricant composition of claim 2 wherein the oil is phenylmethylpolysiloxane.

6. The lubricant composition of claim 1 wherein the p-oxybenzoyl polymer is present in an amount in the range of from about 10–40 weight percent, based on the total weight of the mixture.

7. The lubricant composition of claim 1 wherein the lubricating oil vehicle is a polyphenylether.

8. The lubricant composition of claim 1 wherein the lubricating oil vehicle is a perfluoroalkylpolyether.

References Cited

UNITED STATES PATENTS 2,147,649    2/1939    Gleason _____ 252—56 S

DANIEL E. WYMAN, Primary Examiner

I. VAUGHN, Assistant Examiner

U.S. Cl. X.R.

252—52, 54, 56 S